F. RUNKEL.
LENS FASTENING.
APPLICATION FILED FEB. 18, 1916.
1,210,213.
Patented Dec. 26, 1916.
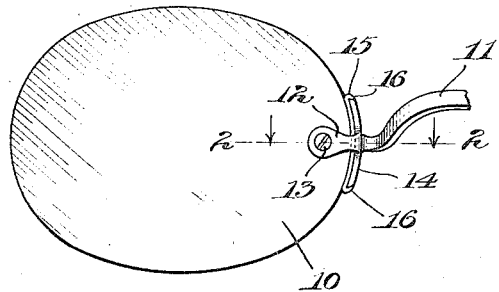
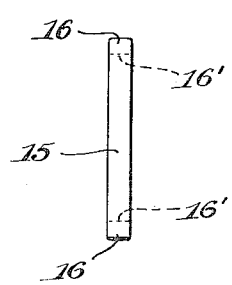
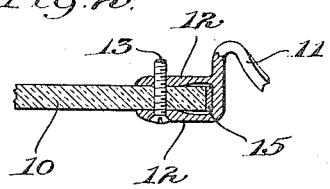
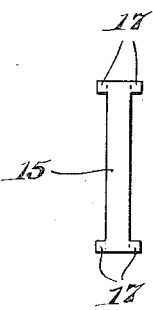
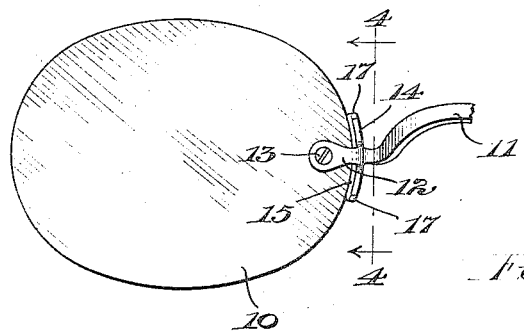
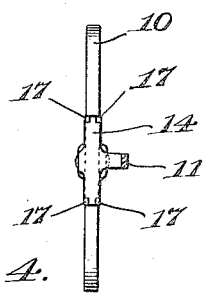
Witnesses:
H. S. Bull
A. A. Olson
Inventor
Frederick Runkel,
by Joshua R. H. Potts
his Attorney.

UNITED STATES PATENT OFFICE.

FREDERICK RUNKEL, OF WAUKEGAN, ILLINOIS.

LENS-FASTENING.

1,210,213.　　　　Specification of Letters Patent.　　Patented Dec. 26, 1916.

Application filed February 18, 1916. Serial No. 79,120.

*To all whom it may concern:*

Be it known that I, FREDERICK RUNKEL, a citizen of the United States, and a resident of the city of Waukegan, county of Lake, and State of Illinois, have invented certain new and useful improvements in Lens-Fastenings, of which the following is a specification.

My invention relates to improvements in eye glasses and has for its object the production of an improved fastening between the lenses of eye glasses and the ends of the nose bridge thereof.

Considerable annoyance is caused to wearers of eye glasses by the reason of the connection between the lenses and the ends of the nose bridge loosening and permitting of looseness or free movement of the lenses, the aim of the invention being to eliminate the cause of this loosening.

A further object is the production of a construction as mentioned which will be simple and economical and highly efficient in use.

Other objects will appear hereinafter.

The invention consists in the combinations and arrangements of parts hereinafter described and claimed.

The invention will be best understood by reference to the accompanying drawing forming a part of this specification, and in which—

Figure 1 is a front elevation of a lens and the adjacent portion of the nose bridge of a conventional pair of eye glasses embodying my invention, Fig. 2 is an enlarged section taken on line 2—2 of Fig. 1, Fig. 3 is a view similar to Fig. 1 of another form of the construction, Fig. 4 is a section taken on line 4—4 of Fig. 3, and Figs. 5 and 6 are plan views of different forms of the reinforcing element included in the invention.

Referring now to the drawing one lens of the eye glasses is shown at 10, the nose bridge coöperating therewith being shown at 11. The end of the nose bridge 11 is formed with ears 12 which engage at opposite sides of the lens 10 being connected therewith by means of a screw 13 which passes through the lens being threaded into one of said ears. Also formed upon the end of the nose bridge is an elongated brace member 14 which extends partially around the periphery of the lens. The construction thus far described is old and well known, being the conventional construction in general use at the present time.

The improvement constituting the subject matter of this application and which coöperates with the construction thus far described is embodied in an elongated thin reinforcing member 15 preferably of suitable metal which is interposed between the ears 12 and the brace 14 and the adjacent portion of the periphery of the lens. The ends only of the member 15 are connected with the brace 14, the central portion of said reinforcing member simply resting loosely between the brace and the lens. In the form shown in Figs. 1 and 5 the ends 16 of the member 15 are bent on a line 16' to engage over the ends of the brace 14. In the form shown in Figs. 3 and 4 the ends of the member 15 are formed with ears 17 which embrace or dovetail with the reduced ends of the brace 14. Or if desired the ends of the member 15 may be secured to the brace member by simply soldering.

With this construction it will be seen that the end portions of the brace 14 will be securely locked against outward bending, thereby eliminating the principal cause of loosening of lenses in glasses of conventional construction. The brace members 14 in eye glasses of conventional construction are usually made of gold and are not firm enough to withstand the strain upon the same. This results in said ends bending outwardly, thereby loosening the lens which eventually results in the loosening of the screw 13 caused by vibration or movement of the lens. With applicant's construction however this outward bending of the ends of brace member 14 is rendered impossible and thus the connection between the bridge and the lens rendered secure and rigid.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In eye glasses, the combination with one of the lenses thereof, of a connecting element fastened to said lens; an elongated brace on said connecting element coöperating with the lens and extending partially around the periphery thereof; and a reinforcing member interposed between the lens and said brace and connected with the latter for preventing outward bending of the lens of said brace, substantially as described.

2. In eye glasses, the combination with one of the lenses thereof, of a connecting element fastened to said lens; an elongated brace on said connecting element coöperating with the lens and extending partially around the periphery thereof; and a reinforcing member interposed between the lens and said brace and connected with the ends of the latter for preventing outward bending of the end portions of the brace, substantially as described.

3. In eye glasses, the combination with one of the lenses thereof, of a connecting element fastened to said lens; an elongated brace on said connecting element coöperating with the lens and extending partially around the periphery thereof; and an elongated comparatively thin reinforcing member interposed between the lens and said brace and connected with the ends of the brace for preventing outward bending of the end portions of said brace, substantially as described.

4. In eye glasses, the combination with one of the lenses thereof, of a nose bridge connected at one end to said lens; ears on said end of said bridge engaging against opposite sides of the lens; a fastening member connecting said ears and passing through the lens; a brace coöperating with the lens and extending partially around the periphery thereof; and an elongated comparatively thin reinforcing member arranged between said ears and interposed between the lens and said brace and connected with the ends of said brace for preventing outward bending of the end portions of said brace, substantially as described.

In testimony whereof I have signed my name to this specification in the presence of two subscribing witnesses.

FREDERICK RUNKEL.

Witnesses:
  W. C. UPTON,
  F. W. B. ACHEN.